May 23, 1944.  J. C. ADAMS  2,349,600
INTERNAL COMBUSTION ENGINE
Filed July 2, 1943   2 Sheets-Sheet 2
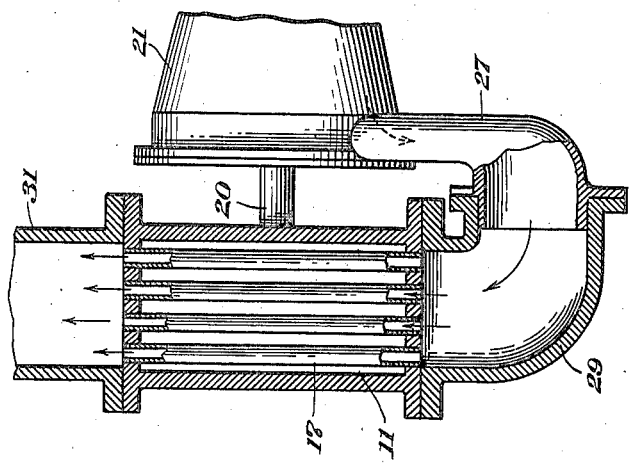
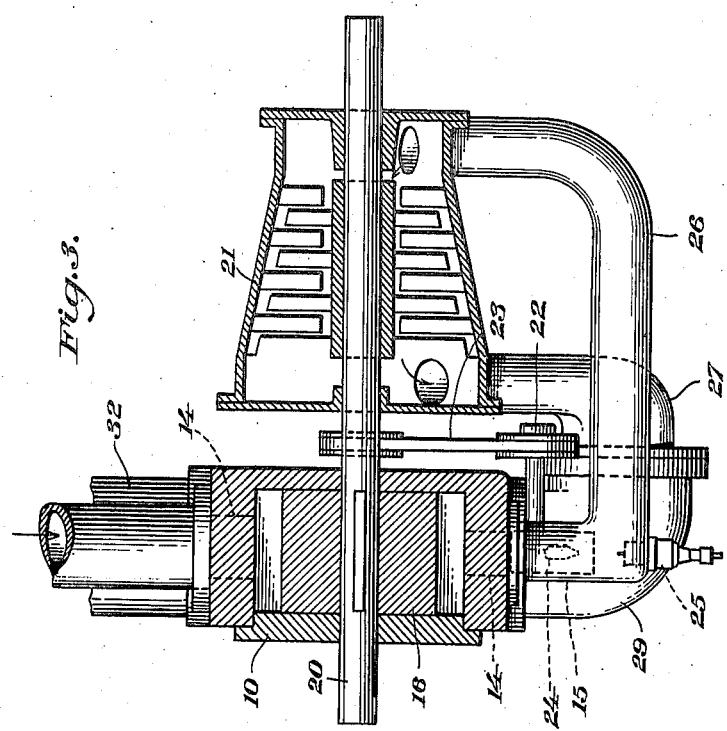
INVENTOR.
John C. Adams
BY
Victor J. Evans & Co.
ATTORNEYS Patented May 23, 1944

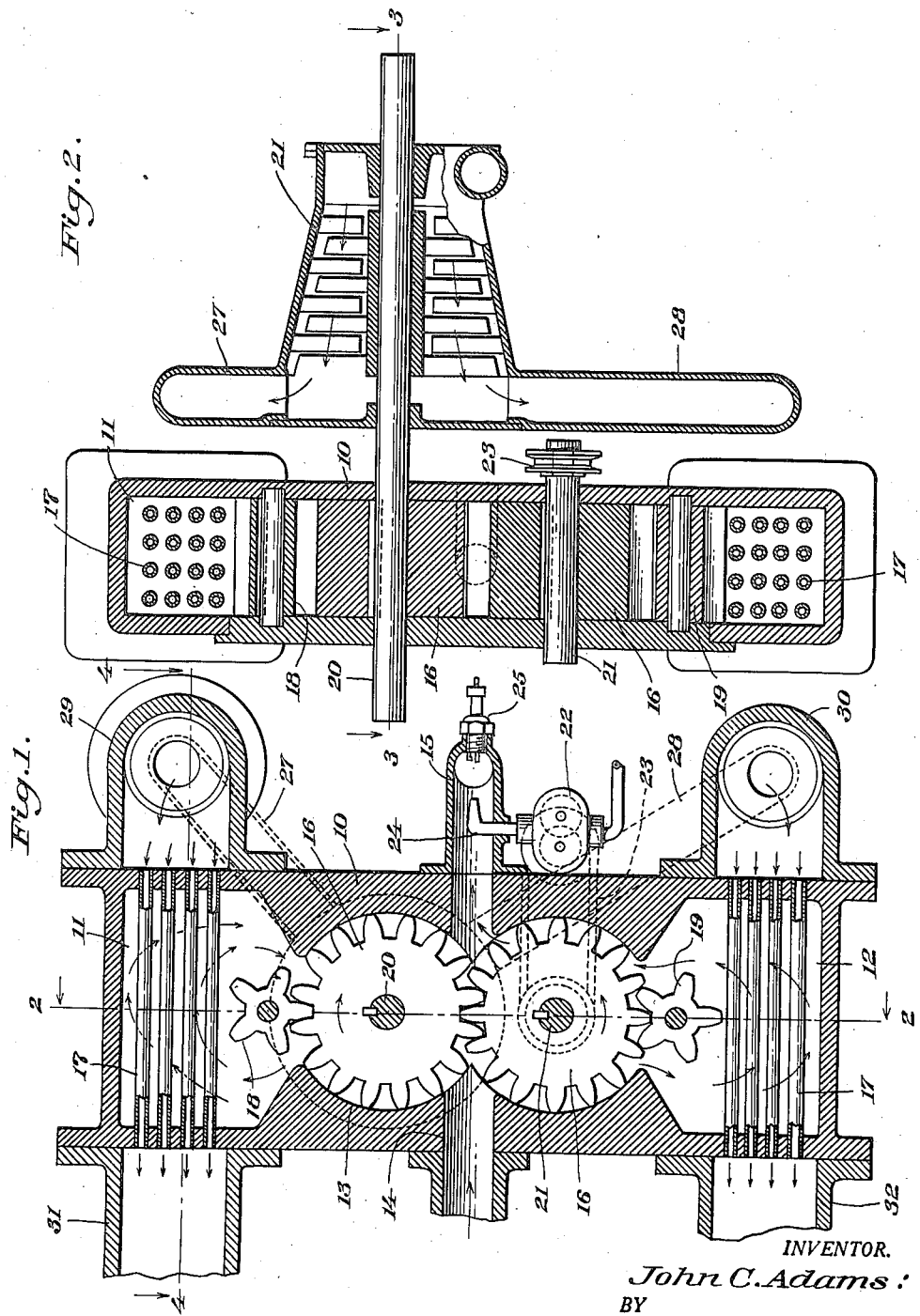

2,349,600

UNITED STATES PATENT OFFICE 2,349,600

INTERNAL-COMBUSTION ENGINE

John C. Adams, Fairbanks, Territory of Alaska

Application July 2, 1943, Serial No. 493,266

3 Claims. (Cl. 60—41)

This invention relates to an internal combustion engine and has for an object to provide a simplified combustion engine, devoid of inlet and outlet valves and comprising essentially only a gear pump, a heat transfer system, a combustion chamber and a multistage turbine, the only moving parts being two main gears, the internal parts of the turbine, and the fuel pump, the advantage being a minimum of heat loss.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming a part of this specification:

Figure 1 is a vertical sectional view of an internal combustion engine constructed in accordance with the invention.

Figure 2 is a vertical sectional view of the engine taken on the line 2—2 of Figure 1.

Figure 3 is a cross sectional view of the engine taken on the line 3—3 of Figure 2.

Figure 4 is a cross sectional view of the engine taken on the line 4—4 of Figure 1.

Referring now to the drawings in which like characters of reference designate similar parts in the various views, the internal combustion engine comprises a casing 10 formed to provide an upper preheat chamber 11, a lower preheat chamber 12, a compressor chamber 13, an air passage 14. The air intake passage communicates with an elongated combustion chamber 15 into which atmospheric air is pumped by meshing gears 16 forming a gear pump, located in the chamber 13.

Disposed in the upper and lower preheat chambers 11 and 12 are a plurality of tubes 17, 17 through which gases after combustion pass to heat the space in the preheat chambers. The incoming air is forced by the gears as indicated by the arrowheads into the heating chambers 11 and 12 where it is preheated before delivery to the combustion chamber as also indicated by arrowheads, see Figure 1. Idle gears 18 and 19 are located in the preheat chambers and mesh with the gears 16 and 16 to expell all of the air from the gears.

The upper gear 13 is provided with a shaft 20 which is extended at both ends beyond the casing 10 and a conventional multistage turbine 21 is mounted on one end of the shaft. The turbine drives the upper gear 16 which in turn drives the lower gear. The lower gear is provided with a shaft 21 which is connected to a conventional fuel pump 22 through the medium of a belt drive 23. When the gears 16 are driven the fuel pump is simultaneously driven to discharge fuel through a spray nozzle 24 into the combustion chamber. A spark plug 25 is located in the combustion chamber to ignite the fuel to start operation, it being optional to manually crank the engine, as is conventional through the medium of the shaft 20 to effect starting, and thereafter the intake of air and supply of fuel as well as the combustion of the fuel is continuous.

From the combustion chamber 15 the gases after undergoing combustion enter the small end of the turbine 21 through a pipe 26 and progress to the large end of the turbine and are conducted by pipes 27 and 28 to intake headers 29 and 30 for the upper and lower preheat chambers 11 and 12, see Figure 1. The hot gases progress through the pipes 17, 17 in the preheat chambers and are exhausted to the atmosphere through exhaust pipes 31 and 32, and during progress through the pipes heat the incoming air being pumped through the passages to the combustion chamber 15.

It will be pointed out that the pressure operating the turbine is no greater than the pressure of the gas delivered by the compressor to the combustion chamber, the gas having undergone combustion. The gas therefore occupies more volume per unit of weight, and will deliver more energy expanding to atmospheric pressure than is required to compress the gas to combustion chamber pressure.

From the above description it is thought that the construction and operation of the invention will be fully understood without further explanation.

What is claimed is:

1. An internal combustion engine comprising a casing formed to provide upper and lower preheat chambers, a compressor chamber communicating with both preheat chambers, an air passage for conducting atmospheric air through the compressor chamber through the preheat chambers, a combustion chamber in which the compressed air is forced after leaving the preheat chambers, a fuel pump for supplying fuel to the combustion chamber, ignition means in the combustion chamber, a multistage turbine, pipes conducting the gaseous products of combustion from the combustion chamber through the turbine, pipes conducting the exhaust gases from the turbine to the preheat chambers, pipes in the preheat chambers conducting the exhaust gases through the chambers to the atmosphere, pump gears in the compression chamber driven by the turbine, and motion transmitting means for driving the fuel pump from one of the gears.

2. The structure as of claim 1 and in which idle gears are disposed in the compression chamber meshing with the pump gears for expelling all of the atmospheric air from the pump gears to the preheat chambers.

3. The structure as of claim 1 and in which the turbine is provided with a shaft on which one of the gears is mounted, the arrangement being such that the turbine drives the pump gears.

JOHN C. ADAMS.